United States Patent [19]
Johnson et al.

[11] Patent Number: 5,258,872
[45] Date of Patent: Nov. 2, 1993

[54] OPTICAL FILTER

[75] Inventors: Walter E. Johnson, Dayton; Robert L. Crane, Kettering, both of Ohio

[73] Assignee: The United States of America as represented by the Secretary of the Air Force, Washington, D.C.

[21] Appl. No.: 954,998

[22] Filed: Oct. 1, 1992

[51] Int. Cl.⁵ .......................... G02B 5/28; G02B 5/10
[52] U.S. Cl. ..................................... 359/589; 359/580
[58] Field of Search ......................... 359/584, 586, 589

[56] References Cited

U.S. PATENT DOCUMENTS

| | | | |
|---|---|---|---|
| 4,545,646 | 10/1985 | Chern et al. | 359/900 |
| 4,826,267 | 5/1989 | Hall et al. | 359/586 |
| 4,952,025 | 8/1990 | Gunning, III | 359/586 |
| 5,009,485 | 4/1991 | Hall | 359/586 |
| 5,028,136 | 7/1991 | Murarka et al. | 356/349 |

Primary Examiner—Bruce Y. Arnold
Assistant Examiner—Darryl Collins
Attorney, Agent, or Firm—Bobby D. Scearce; Donald J. Singer

[57] ABSTRACT

A high reflection optical filter is described which comprises a film of a dielectric, inorganic or organic or other suitable material deposited on a suitable optically transparent substrate, the film having between a surface thereof exposed to incident radiation and an interface with the substrate a sinusoidal refractive index profile with selected number of periods and selected phase at the exposed surface in single band configurations, and superimposed multiple sinusoidal refractive index profiles with selected phase alignment of the superimposed profiles at the exposed surface in multi-band configurations.

9 Claims, 7 Drawing Sheets

OPTICAL FILTER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical filters, and more particularly to single or multiple band high reflection optical filters having increased laser damage threshold through reduction of the standing wave field profiles at the wavelengths of the invasive laser wavelengths to be reflected.

A multi-layer stack high reflection optical filter usually includes a substrate having a layered optical film thereon facing incident potentially damaging radiation. The film normally has alternate high and low refractive index dielectric layers having optical thicknesses of a quarter-wavelength of the radiation to be reflected. Each layer interface presents optical, thermal and mechanical mismatches highly susceptible to laser damage.

Efforts to increase the laser damage threshold probability of multi-layer stack high reflection filters have included changing layer thicknesses to move maximum flux densities in the standing wave field profile away from layer interfaces, such as by changing the optical thicknesses of a layer pair added to the exposed side of the filter, by modifying the optical thicknesses of up to three layer pairs added to the exposed side of the filter, and by adding a half-wave thick overcoat layer of the low refractive index material to the exposed side.

Efforts to increase laser damage threshold of filters having graded refractive index profiles have included mixing two materials to relieve film stress, using porous antireflective surfaces and coatings (graded refractive index surface layer), and adding two graded refractive index layers of half-wave optical thicknesses to a quarter-wave optical thickness multi-layer stack.

In improved optical filters of this invention, laser damage threshold is increased at wavelengths coincident with laser radiation to be reflected by reducing standing wave field profiles within optical films comprising the filters. Filters structured according to the invention comprise continuously varying sinusoidal refractive index profiles with selected number of periods and selected phase at an interface where incident laser light impinges the filter in single band configurations, and superimposed multiple sinusoidal refractive index profiles with selected phase alignment of superimposed profiles at the interface where laser light impinges the filter in multi-band configurations.

Increased laser damage threshold of optical filters provided by the invention has application to laser survivability of high reflection optical filters operating in the ultraviolet, visible, infrared and microwave including dichroic beam splitters, dielectric laser mirror coatings, dielectric hot/cold mirrors and laser protection passband optical filters.

It is therefore a principal object of the invention to provide an improved optical filter.

It is a further object of the invention to provide an optical filter which may be configured for operation in the ultraviolet, visible, infrared or microwave regions of the spectrum.

It is a further object of the invention to provide an optical filter wherein selective alignment is made of the phase of sinusoidal refractive index profiles of an optical film at an interface where potentially damaging laser light is incident.

These and other objects of the invention will become apparent as a detailed description of representative embodiments proceeds.

SUMMARY OF THE INVENTION

In accordance with the foregoing principles and objects of the invention, a high reflection optical filter is described which comprises a film of a dielectric, inorganic or organic or other suitable material deposited on a suitable optically transparent substrate, the film having between a surface thereof exposed to incident radiation and an interface with the substrate a sinusoidal refractive index profile with selected number of periods and selected phase at the exposed surface in single band configurations, and superimposed multiple sinusoidal refractive index profiles with selected phase alignment of the superimposed profiles at the exposed surface in multi-band configurations.

DESCRIPTION OF THE DRAWINGS

The invention will be more clearly understood from the following detailed description of representative embodiments thereof read in conjunction with the accompanying drawings wherein:

FIG. 1b is a graph of refractive index versus cycle number in an optical film according to the invention which may be included generally in the structure shown in FIG. 1a;

FIG. 2b is a reflectance spectrum for the single band optical filter of FIG. 2a;

FIG. 7a shows a reflectance spectrum for a six-band optical filter as shown in FIG. 4a.

DETAILED DESCRIPTION

Figure 1A:
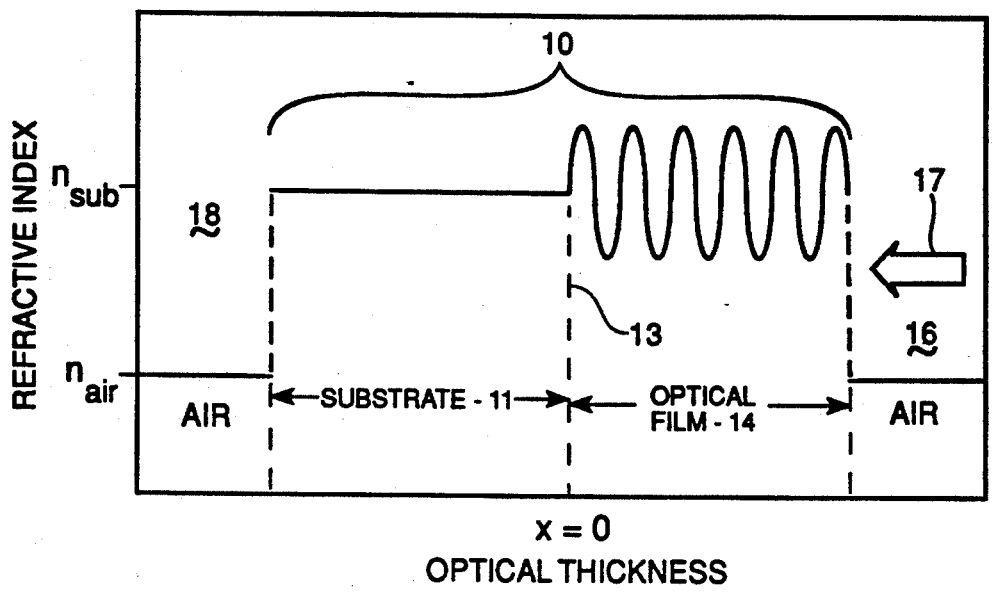
FIG. 1a is a schematic illustration of refractive index versus optical thickness for a typical optical filter structure.
Figure 1B:
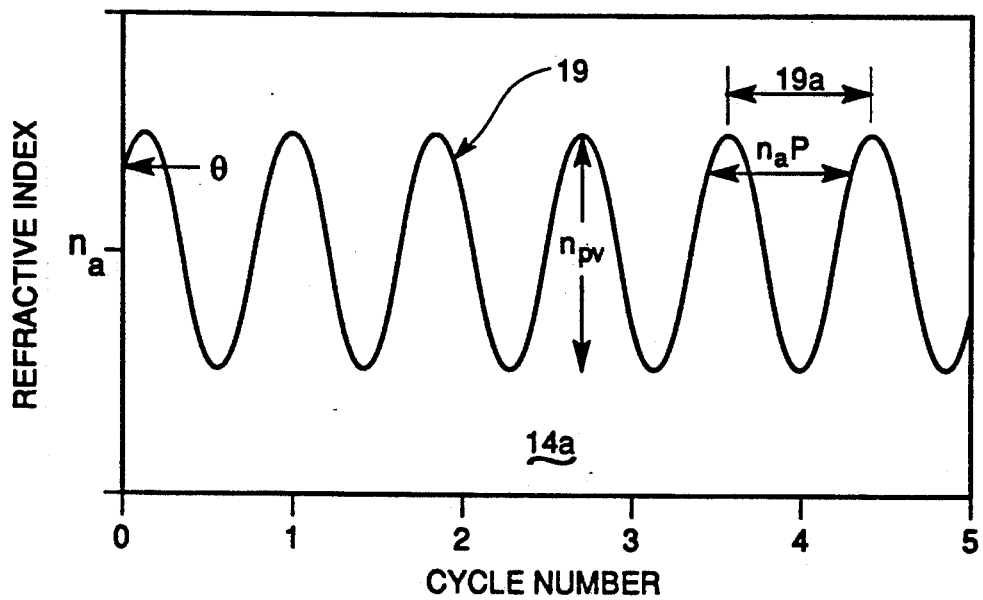

Referring now to the drawings, FIG. 1a shows a schematic of refractive index versus optical thickness for a typical optical filter structure. FIG. 1b is a graph of refractive index versus cycle number in an optical film structured according to the invention and includable in the general structure illustrated in FIG. 1a. In FIG. 1a, filter 10 may be considered as comprising substrate 11 of suitable transparent optical material of refractive index $n_{sub}$ such as glass (1.52), polycarbonate (1.59), silicon (3.44), germanium (4.00), or the like. On one surface 13 of substrate 11 is deposited optical film 14 of suitable optical material such as a dielectric including silicon dioxide, titanium dioxide, silicon, zinc selenide, or an organic material including polyester, polymethylmethacrylate, siloxane or a suitable polymeric or biopolymer, film 14 thickness being dependent on the desired reflective characteristics of applied film 14 considering the wavelengths to be rejected, the average refractive index of the film 14 material and the refractive index profile imposed on a film structured in accordance with these teachings. Filter 10 may be disposed in a system between a first region comprising a medium 16 (such as air) through which a signal 17 travels to be received by filter 10, and a second region comprising a medium 18 (such as air or other gas, or other optical material) disposed within an optical system protected by filter 10.

In accordance with these teachings, an optical film 14a, deposited on appropriate substrate 11, has a sinusoidal refractive index profile 19 of general form shown in FIG. 1b. The refractive index n(x) at any point along profile 19 (i.e. along an axis normal to film 14a) between a surface exposed to radiation and the interface with the substrate is given by:

$$n(x) = n_a + \frac{n_{pv}}{2} \sin\left[\frac{2\pi x}{n_a P} + \theta\right] \quad (1)$$

where $n_a$ is the average refractive index of film 14a, $n_{pv}$ is the peak-to-valley excursion of the refractive index along profile 19, $\theta$ is the phase angle of profile 19 at the substrate 11/film 14a interface (selectable at 0-2$\pi$ radians), and P is the physical thickness of a single cycle 19a (the period) of profile 19, the optical thickness of each cycle 19a being equal to $n_a P$; film 14a may comprise any suitable number N of cycles 19a (each of optical thickness $n_a P$) defining profile 19.

Film 14a may be deposited by any of the known techniques for thin film deposition appropriate to the film materials mentioned above, as would occur to one with ordinary skill in the field, such as chemical vapor deposition, physical vapor deposition, molecular beam epitaxy, spin coating or Langmuir-Blodgett.

Figure 2A:
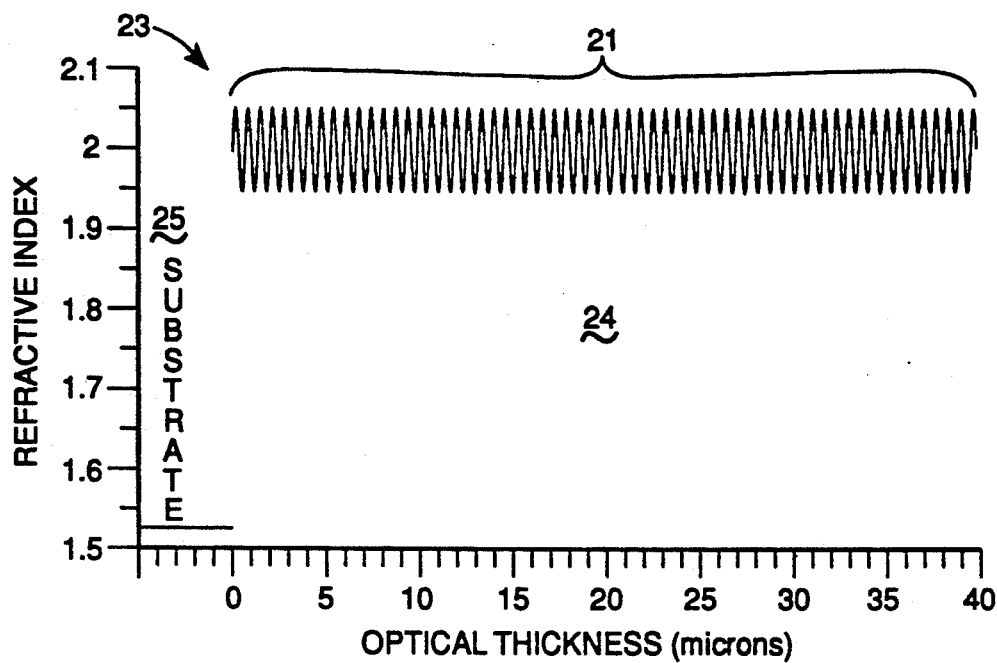
FIG. 2a shows the sinusoidal refractive index profile versus optical thickness for a single band optical filter.
Figure 2B:
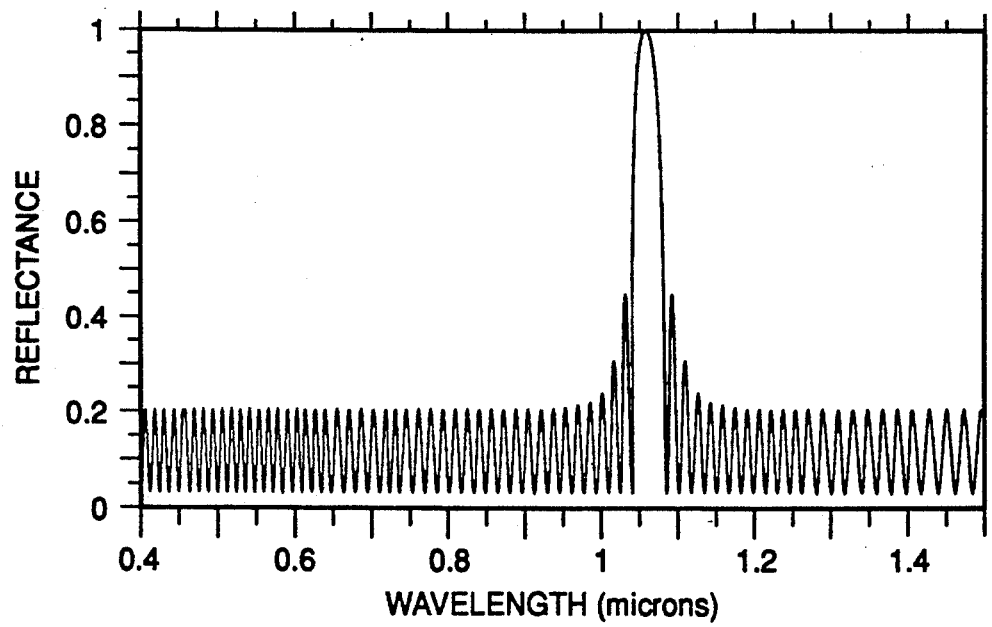

A sinusoidal refractive index profile having numerous identical cycles 19a produces one highly reflective band having no associated higher order reflection bands and can be spectrally positioned anywhere in the filter passband. The reflection band resides at wavelength $\lambda$ equal to $2n_a P$, i.e., twice the optical thickness of one cycle 19a. Referring now to FIG. 2a, shown is sinusoidal refractive index profile 21 of a single band optical filter 23 according to the invention, comprising film 24 of silicon dioxide (1.52) and titanium dioxide (2.4) on substrate 25 of glass (1.52). Profile 21 (FIG. 2a) comprises a plurality of identical cycles having optical thickness $n_a P$ equal to 0.532 microns ($\mu$m), and therefore produces a reflection band illustrated in FIG. 2b which peaks at 1.064 $\mu$m. Filter 23 of FIG. 2a is otherwise characterized by $n_a=2$, $n_{pv}=0.1$, $\theta=0$ and N=70.5 cycles.

A filter structured according to the invention as aforesaid interacts with incident coherent (laser) radiation of selected wavelength via the interference phenomenon, wherein the film reflects a return wavefront traveling in a direction opposite to that of the incident wavefront. The two oppositely traveling waves interfere to produce a standing wave field within the film. Laser damage within optical films is related to peaks in this standing wave field profile.

Consider a model for the invention to calculate the standing wave field within the film assuming an incident plane wave flux density of 1 watt/cm$^2$ irradiates the film/air interface of the filter at normal incidence, the refractive profile of the film has $n_a=2$, $n_{pv}=0.2$ and $n_a P=0.532$ $\mu$m (reflection band peaking at $\lambda=1.064$ $\mu$m); only N and $\theta$ are varied.

Figure 3A:
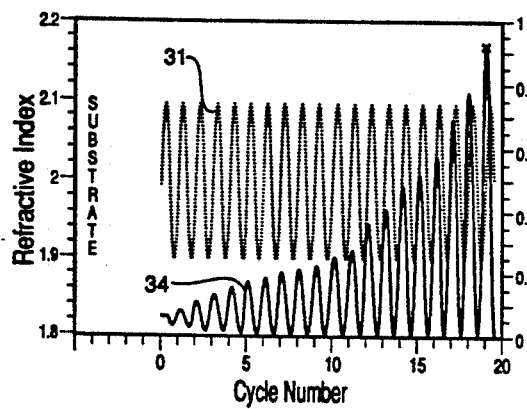
FIGS. 3a–3f show refractive index, standing wave (flux density) and corresponding maximum flux density profiles for three $N,\theta$ values in a representative film of the invention.

Referring now to FIGS. 3a-3f, shown therein are the refractive index profiles 31,32,33, the standing wave profiles 34,35,36, and the corresponding maximum flux densities 37,38,39 versus optical thickness for the film model just suggested for different N,-74 . In FIG. 3a, $\theta=0$ and N=19.5. Profiles 34,35,36 indicate that the standing wave field within the film diminishes in magnitude as a function of optical thickness. The positions labeled "x" in FIGS. 3a,c and e the maximum flux density of the standing wave field within the films. The positions marked "x" in FIGS. 3b, 3d, and 3f correspond to the maximum expected flux density in FIG. 3a, 3c and 3e at the indicated cycle numbers. In the profiles of FIG. 3a, the maximum flux density is 0.89 watt/cm$^2$ and occurs at the 19th cycle where n(x) equals 2, which is $n_a$ for the film. Other peaks in the flux density profile also occur at an integer number of cycles, e.g., 0.76 watt/cm$^2$ at 18 cycles, 0.65 watt/cm$^2$ at 17 cycles, and 0.56 watt/cm$^2$ at 16 cycles, all at locations where n(x)=2.

Figure 3B:
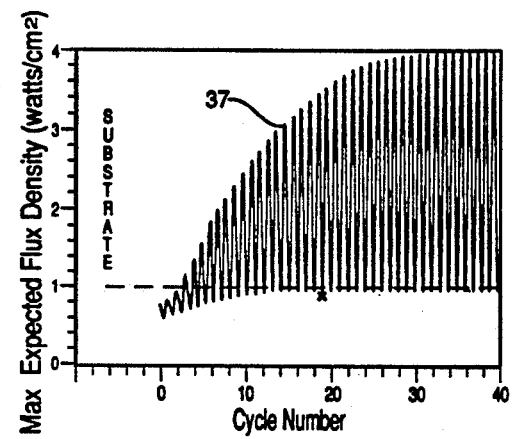

The maximum flux density exhibits cyclic variation as a function of number of cycles comprising the refractive index profile. In FIG. 3b, "x" occurs at N=19.5 and 0.89 watt/cm$^2$, the maximum flux density shown in FIG. 3a. As the number of cycles increases, the maximum flux density varies asymptotically between 1 and 4 watt/cm$^2$. The minimum values in the maximum flux density occur when the refractive index profiles end with a downward slope on a half cycle at $n(x)=n_a=2$.

Variation in maximum flux density may be defined using the general equation for interference between two coherent light waves, namely, $$I=I_1+I_2+2(I_1 I_2)^{\frac{1}{2}}\cos\alpha$$

where I is the total flux density resulting from interference of incident light wave with flux density $I_1$ and reflected light wave with flux density $I_2$ and $\alpha$ is the phase difference between $I_1$ and $I_2$. If interference term $2(I_1 I_2)^{\frac{1}{2}}\cos\alpha$ is positive (negative), constructive (destructive) interference exists between $I_1$ and $I_2$. For $I_1=I_2=1$ watt/cm$^2$, total flux densities of 2 watt/cm$^2$ or more result from constructive interference, while flux densities less than 2 watt/cm$^2$ result from destructive interference between $I_1$ and $I_2$. Total constructive interference exists at I=4 watt/cm$^2$ and total destructive interference exists at I=0. As N increases, $I_2$ approaches but never equals, $I_1$. FIG. 3b shows that the optical filter can exhibit either constructive or destructive interference as a function of the fractional number of cycles comprising the refractive index profile.

Figure 3C:
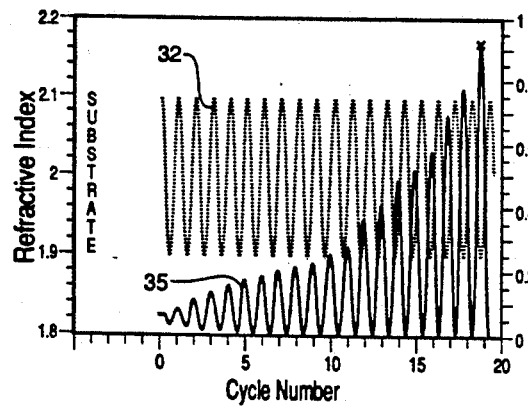

If $\theta=\frac{1}{2}$ and N=19.25, flux density also diminishes with film thickness as suggested in FIG. 3c. All flux density peaks occur at 0.75 times an integer number of cycles, where $n(x)=n_a=2$, for example, 0.88 watt/cm$^2$ at 18.75 cycles, 0.76 watt/cm$^2$ at 17.75 cycles, and 0.65 watt/cm$^2$ at 16.75 cycles.

Figure 3D:
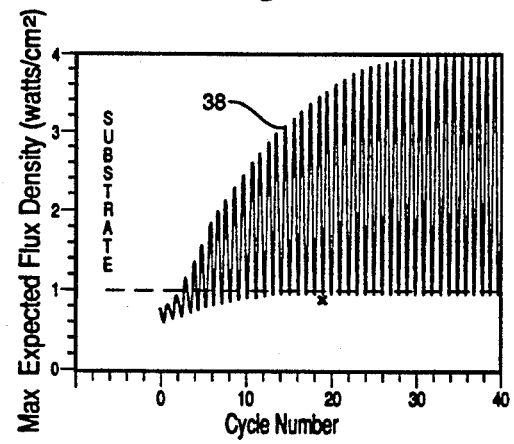

The single band filter structure suggested in FIG. 3c also exhibits cyclic variation in maximum flux density as a function of N as FIG. 3d suggests. As N is increased, maximum flux density varies asymptotically between 1 and 4 watt/cm² and minimum values in maximum flux density occur when the refractive index profile ends with a downward slope on a half cycle at $n(x)=n_a=2$.

Figure 3E:
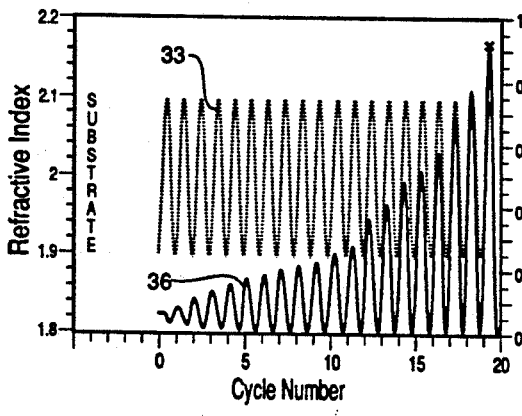
Figure 3F:
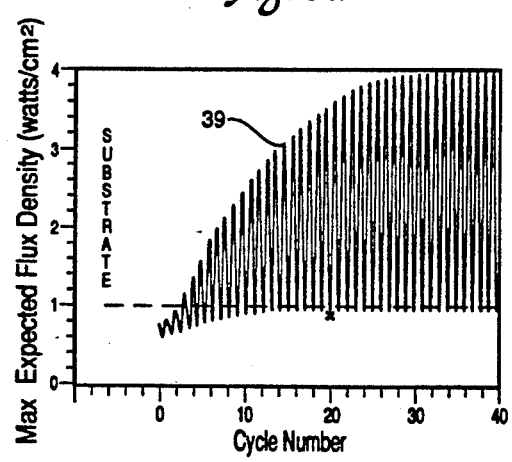

In a third single band filter model of the invention as shown in FIG. 3e, let $\theta=1.4\pi$ and N=19.8. Maximum flux density is 0.88 watt/cm² at 19.3 cycles, where $n(x)=n_a=2$. Other flux density peaks occur at each 0.3 cycle, namely, 18.3, 17.3 and 16.3. This model also exhibits cyclic variation in maximum flux density as a function of N as suggested in FIG. 3f. As N is increased, maximum flux density varies asymptotically between 1 and 4 watt/cm², and minimum values in the maximum flux density occur when the refractive index profile ends with a downward slope on a half cycle at $n(x)=n_a=2$.

Figure 4A:
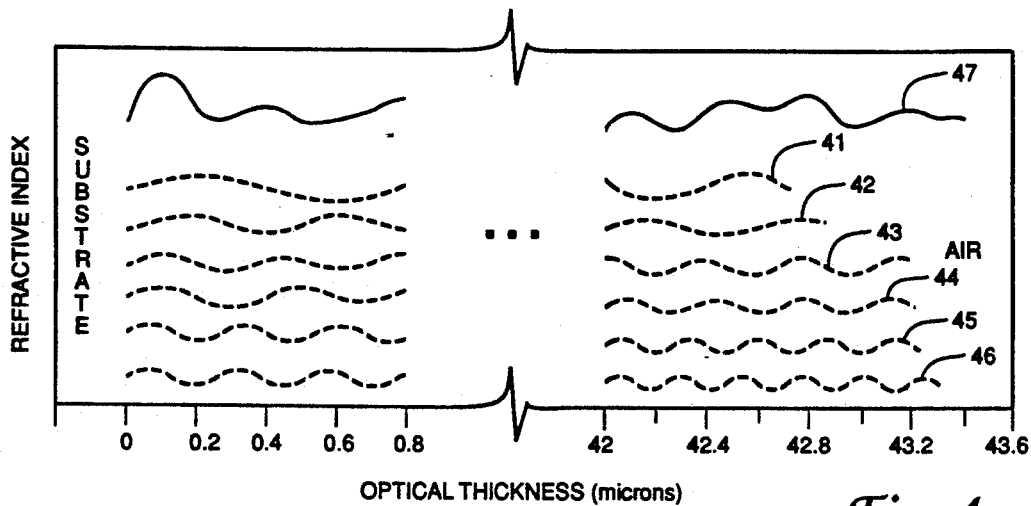
FIGS. 4a–4c show refractive index profiles for a six-band optical filter, a filled six-band optical filter, and a filled and pushed optical filter according to the invention.
Figure 4B:
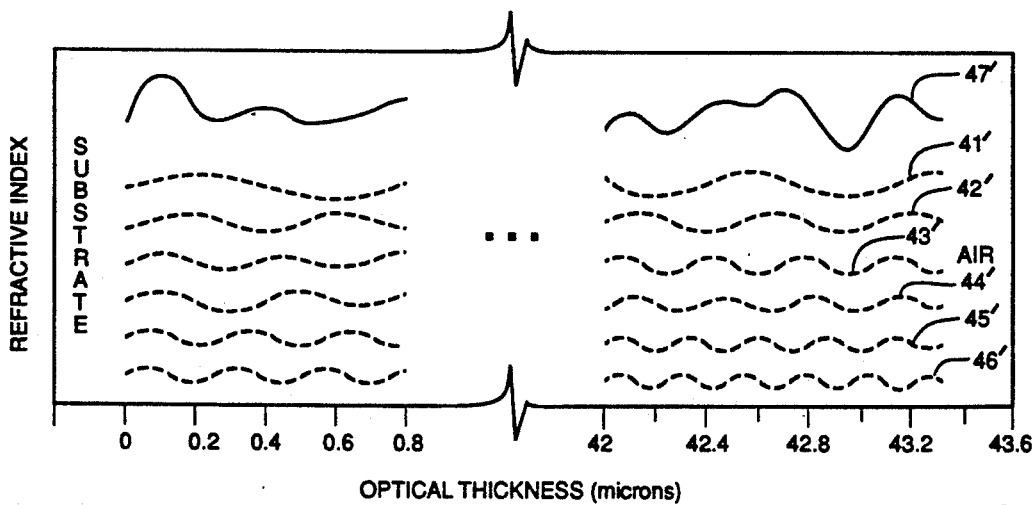
Figure 4C:
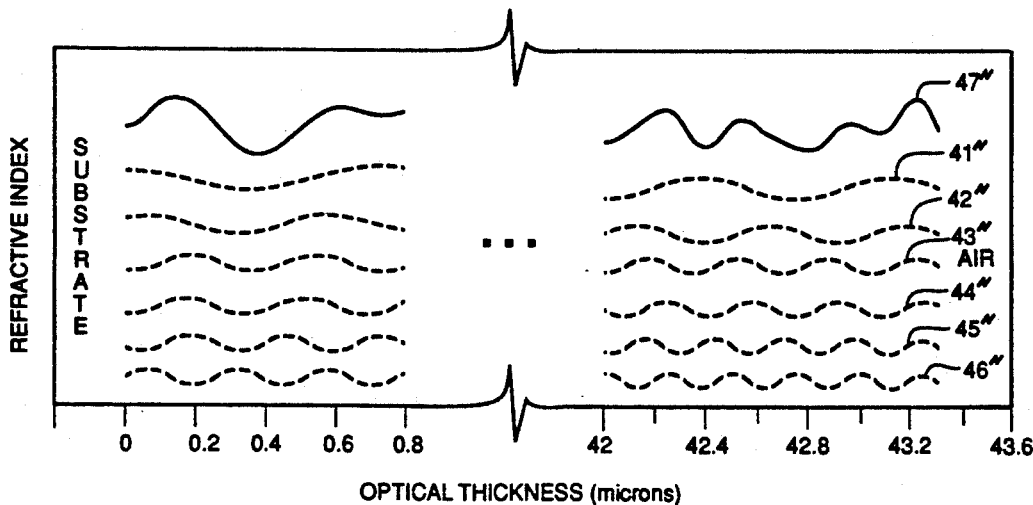
Figure 5A:
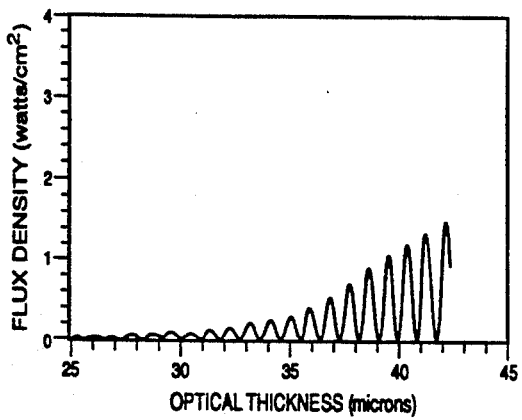
FIGS. 5a–5f show standing wave profiles for the filter of FIG. 4a for six laser wavelengths.
Figure 5B:
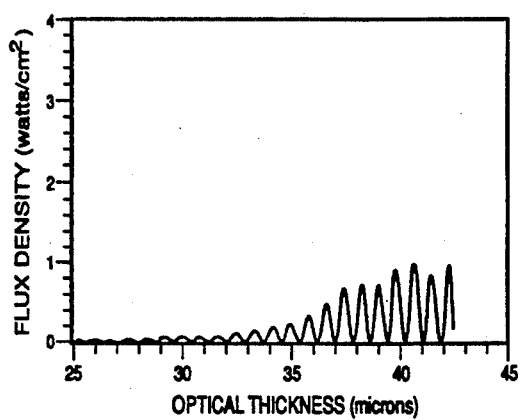
Figure 5C:
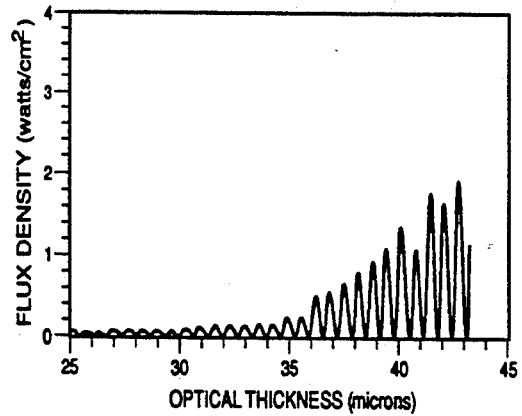
Figure 5D:
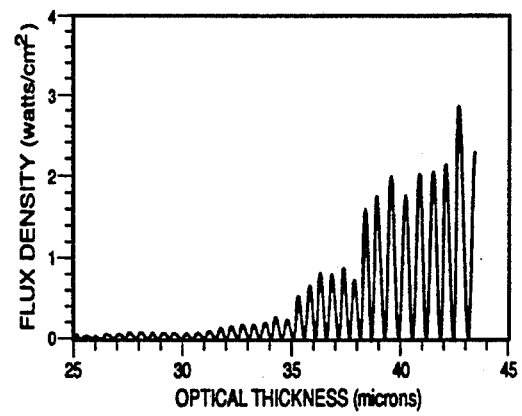
Figure 5E:
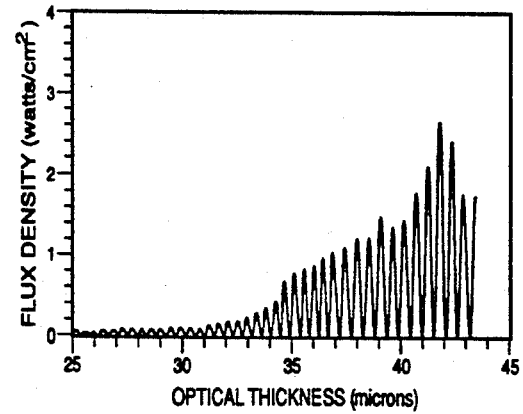
Figure 5F:
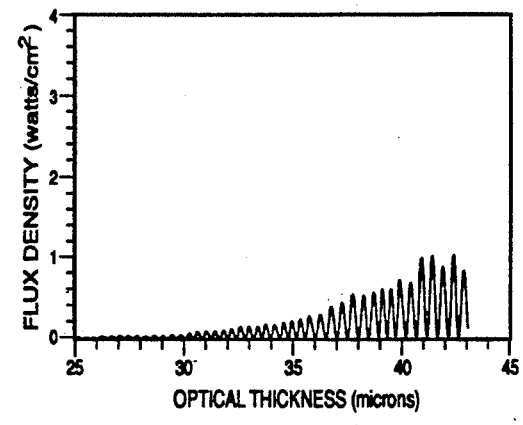
Figure 6A:
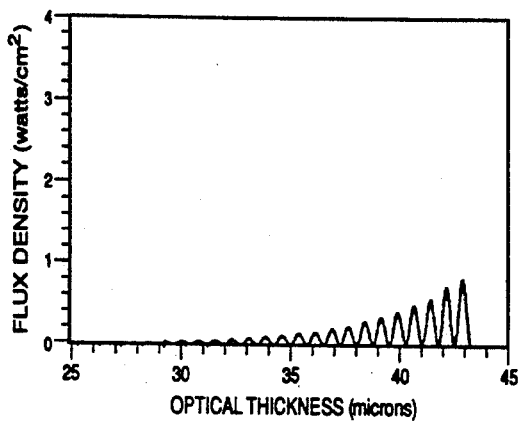
FIGS. 6a–6f show low flux density standing wave profiles for the filter of FIG. 4c for six laser wavelengths.
Figure 6B:
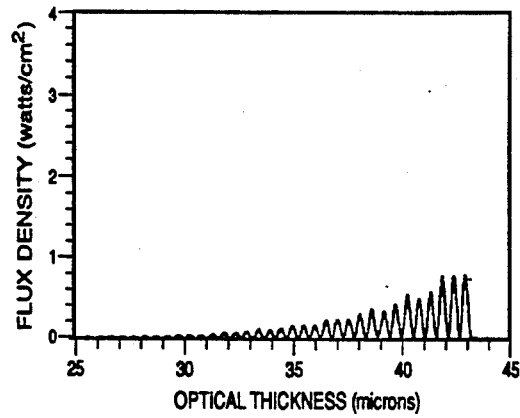
Figure 6C:
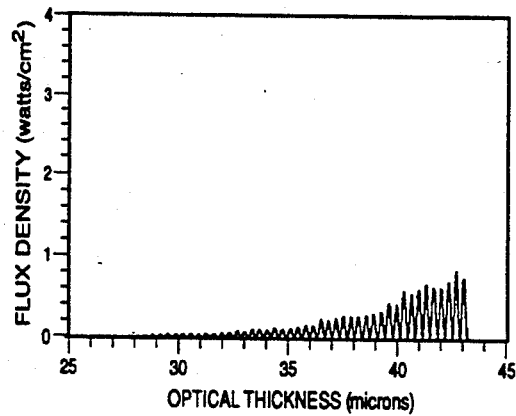
Figure 6D:
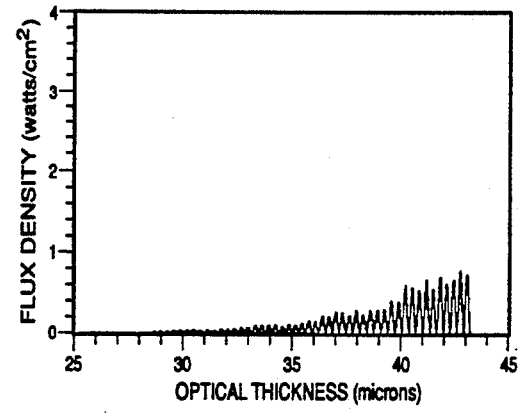
Figure 6E:
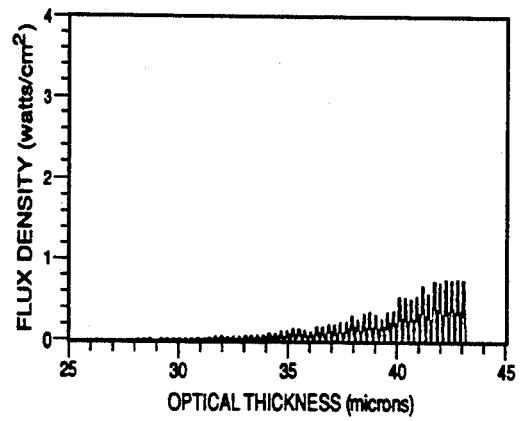
Figure 6F:
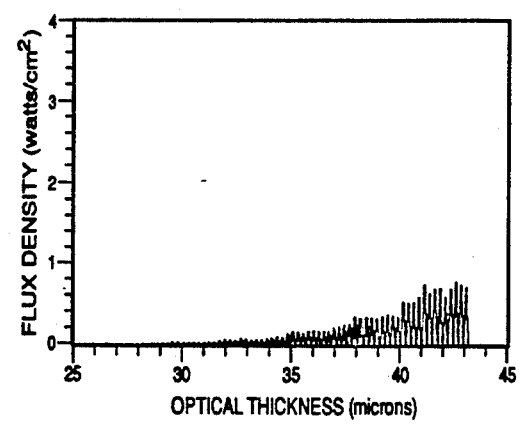

A multi-band optical filter according to the invention for operation at substantially any number of laser wavelengths may be described using a six-band high reflection optical filter having bands spectrally positioned at arbitrary laser wavelengths. TABLE I describe six sinusoidal refractive index profiles which produce the bands. FIGS. 4a-c show the six constituent refractive index profiles of TABLE I with profiles having various selected optical thicknesses; composite profile 47 results from superposition of Profiles 41-46. Only profile 46 for the 0.488 μm reflection band traverses the entire optical thickness of the film, profiles 41-45 being terminated somewhat short of the film/air interface. Profiles 41-45 which end short of the film/air interface are continued (filled) that is, the number of cycles of each profile is adjusted (increasing), so that each profile ends at the film/air interface as suggested by profiles 41'-45' and composite 47' of FIG. 4b, and then pushed (shifted), that is, each profile is shifted along x, so that all resulting profiles 41"-46" and composite 47" end with a downward slope on a half cycle at $n_a$ at the film/air interface as suggested in FIG. 4c. Filling and pushing profiles 41-45 change N and 8 for each profile as suggested by the shape and positions of the resulting profiles 41'-47' of FIG. 4b (by filling) and profiles 41"-47" of FIG. 4c (then by pushing).

Figure 7A:
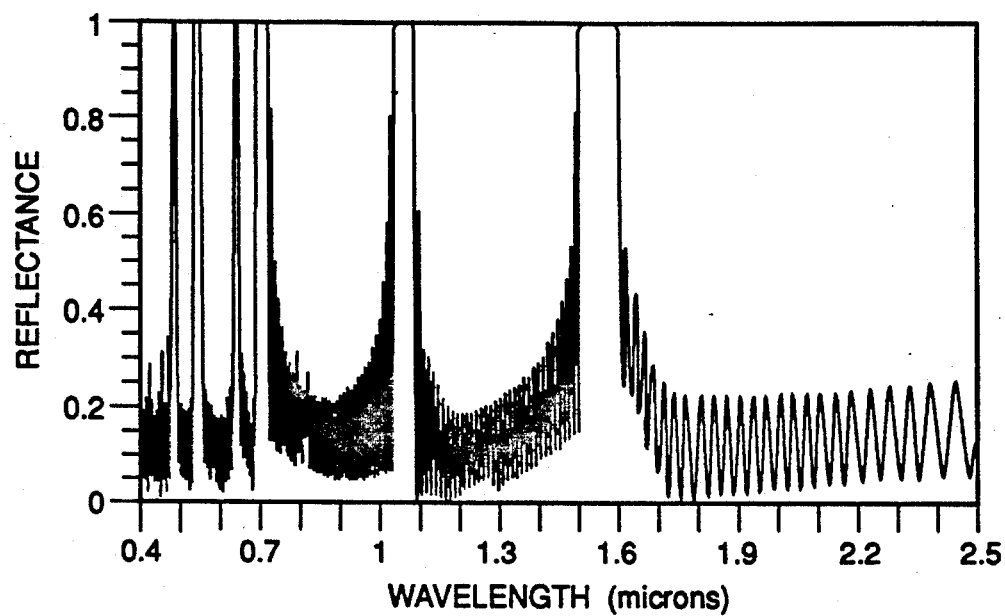
Figure 7B:
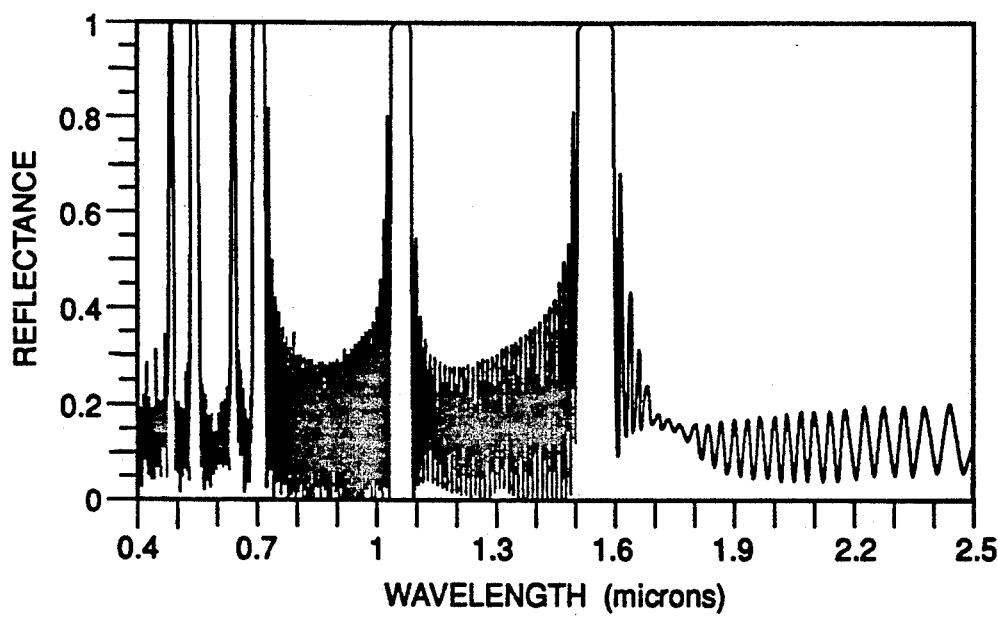
FIG. 7b shows a reflectance spectrum for a six-band optical filter as shown in FIG. 4c according to the invention.

FIGS. 5a-f show various standing wave field profiles within the film of the FIG. 4a filter at the respective six laser wavelengths listed in TABLE I starting at an optical thickness 25 μm from the substrate to the film-/air interface (43.31 μm). The profiles at 1.54 μm, 0.694 μm, 0.633 μm and 0.532 μm (FIGS. 5a,c,d,e) exhibit flux densities exceeding 1 watt/cm² at a plurality of locations within the film. The film of the FIG. 4c filter results in standing wave field profiles within the film having values less than 1 watt/cm² at all six laser wavelengths (shown respectively at FIGS. 6a-f). Therefore, a successfully operable multi-band high reflection optical filter having reduced standing wave field profiles at all laser lines according to the invention is structured by terminating each profile at the exposed surface with a downward slope on a half cycle at $n_a$. The reflectance spectrum for the six-band sinusoidal optical filters of FIGS. 4a,c (before and after filling and pushing the profiles) exhibits very high reflectances at the six laser wavelengths are shown in FIGS. 7a,7b, respectively.

The invention therefore provides an improved optical filter including a reflective film having a sinusoidal refractive index profile through the thickness thereof and selected phase at the exposed surface of the filter. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

TABLE I

| Laser Wavelength (μm) | $n_{pv}$ | $n_aP$ (μm) | N |
|---|---|---|---|
| 1.54 | 0.234 | 0.77 | 55.5 |
| 1.064 | 0.155 | 0.532 | 80.5 |
| 0.694 | 0.107 | 0.347 | 124.5 |
| 0.633 | 0.102 | 0.3165 | 136.5 |
| 0.532 | 0.084 | 0.266 | 162.5 |
| 0.488 | 0.071 | 0.244 | 177.5 |

We claim:

1. An optical filter for a given wavelength λ, comprising:
   (a) a substantially optically transparent substrate;
   (b) a film of optical material deposited on said substrate;
   (c) wherein said film has a sinusoidal refractive index profile to an outer surface thereof, the refractive index n(x) of said film along the thickness thereof being defined by, $$n(x) = n_a + \frac{n_{pv}}{2} \sin\left[\frac{2\pi x}{n_a P} + \theta\right]$$

$x = \theta$ at the surface of the substrate, where x=0 at the surface of the substrate, $n_a$ is the average refractive index of said film, $n_{pv}$ is the difference between the maximum and minimum refractive index along said profile, θ is a preselected phase angle of said profile at X=0, and P is the physical thickness of a cycle of said profile; and
   (d) wherein said profile terminates at said outer surface of the film with n(x) substantially equal to $n_a$ and with n(x) decreasing with x.

2. The filter of claim 1 wherein said film comprises a dielectric.

3. The filter of claim 1 wherein said substrate comprises a substantially transparent material selected from the group consisting of glass, polycarbonate, silicon and germanium.

4. The filter of claim 1 wherein said film comprises an optical material selected from the group consisting of silicon dioxide, titanium dioxide, silicon, zinc selenide, polyester, polymethylmethacrylate, siloxane, a polymer and a biopolymer.

5. An optical filter for a given wavelength γ, comprising:
   (a) a substantially optically transparent substrate;
   (b) a film of optical material deposited on said substrate;
   (c) wherein said film has a refractive index along the thickness thereof defined by the superposition of a plurality of sinusoidal refractive index profiles to an outer surface thereof, each sinusoidal defined by a characteristic refractive index n(x) along the thickness of said film defined by, $$n(x) = n_a + \frac{n_{pv}}{2} \sin\left[\frac{2\pi x}{n_a P} + \theta\right]$$

x = 0 at the surface of the substrate, where x=κ at the surface of the substrate, $n_a$ is the average refractive index of said film, $n_{pv}$ is the characteristic difference between the maximum and minimum refractive index along a respective profile, θ is a characteristic preselected phase angle of a respective profile at X=0, and P is the physical thickness of a cycle of a respective profile; and (d) wherein each profile terminates at said outer surface of the film with n(x) substantially equal to $n_a$ and with n(x) decreasing with x.

6. The filter of claim 5 comprising six distinct superimposed profiles with different respective θ and P values.

7. The filter of claim 5 wherein said film comprises a dielectric.

8. The filter of claim 5 wherein said substrate comprises a substantially transparent material selected from the group consisting of glass, polycarbonate, silicon and germanium.

9. The filter of claim 5 wherein said film comprises an optical material selected from the group consisting of silicon dioxide, titanium dioxide, silicon, zinc selenide, polyester, polymethylmethacrylate, siloxane, a polymer and a biopolymer.

* * * * *

UNITED STATES PATENT AND TRADEMARK OFFICE
CERTIFICATE OF CORRECTION

PATENT NO. : 5,258,872
DATED : November 2, 1993
INVENTOR(S) : Walter E. Johnson et al It is certified that error appears in the above-identified patent and that said Letters Patent is hereby corrected as shown below:

Column 4, line 16, "N-74" should be -- N,$\theta$ --.
Column 4, line 20, -- locate -- should follow " and e".
Column 4, line 21, -- profiles -- should follow "field".
Column 4, line 63, "$\theta$=½" should be -- $\theta$=½$\pi$ --.
Column 5, line 29, "Profiles" should not be capitalized.
Column 5, line 42, "8" should be -- $\theta$ --.
Column 6, line 35, delete "x=$\theta$ at the surface of the substrate".
Column 6, line 45, delete the first occurrence of "with".
Column 7, line 7, delete "x=$\theta$ at the surface of the substrate".
Column 7, line 9,, "K" should be -- 0 --.

Signed and Sealed this

Twenty-fourth Day of May, 1994

Attest:

BRUCE LEHMAN

Attesting Officer    Commissioner of Patents and Trademarks